United States Patent
Kipnis

(10) Patent No.: US 12,138,541 B2
(45) Date of Patent: Nov. 12, 2024

(54) USING SEMANTIC NATURAL LANGUAGE PROCESSING MACHINE LEARNING ALGORITHMS FOR A VIDEO GAME APPLICATION

(71) Applicant: GOOGLE LLC, Mountain View, CA (US)

(72) Inventor: Anna Kipnis, San Bruno, CA (US)

(73) Assignee: GOOGLE LLC, Mountain View, CA (US)

( * ) Notice: Subject to any disclaimer, the term of this patent is extended or adjusted under 35 U.S.C. 154(b) by 216 days.

(21) Appl. No.: 17/770,946

(22) PCT Filed: May 15, 2020

(86) PCT No.: PCT/US2020/033040
§ 371 (c)(1),
(2) Date: Apr. 21, 2022

(87) PCT Pub. No.: WO2021/188131
PCT Pub. Date: Sep. 23, 2021

(65) Prior Publication Data
US 2022/0370908 A1 Nov. 24, 2022

Related U.S. Application Data

(60) Provisional application No. 62/992,368, filed on Mar. 20, 2020.

(51) Int. Cl.
*A63F 13/45* (2014.01)
*A63F 13/55* (2014.01)

(52) U.S. Cl.
CPC .................................. *A63F 13/55* (2014.09)

(58) Field of Classification Search
CPC .......... A63F 13/40; A63F 13/44; A63F 13/45; A63F 13/49; A63F 13/50; A63F 13/52;
(Continued)

(56) References Cited

U.S. PATENT DOCUMENTS 6,699,127 B1 * 3/2004 Lobb ....................... A63F 13/45
463/43
9,756,091 B1    9/2017 Davies
(Continued)

FOREIGN PATENT DOCUMENTS

CN      108014498 A    5/2018
WO      2017066029 A1  4/2017

OTHER PUBLICATIONS

International Search Report and Written Opinion mailed Jul. 31, 2020 for corresponding International Application No. PCT/US2020/033040, 13 pages.
(Continued)

*Primary Examiner* — Omkar A Deodhar

(57) ABSTRACT

Game decisions are coordinated using a semantic natural language processing (NLP) machine learning (ML) algorithm, which is stored in a memory in some cases. In response to a game event, a processor records a text string that represents the game event in a text log that includes a sequence of text strings that represent game events that have transpired during a portion of the game. The processor also generates, using the semantic NLP ML algorithm, scores for labeled actions or content based on the text log and a curve that represents a target player experience as a function of progress through the game. The processor further serves one or more of the labeled actions or content that is selected based on the scores. The labeled actions or content are served to a display associated with the processor.

19 Claims, 7 Drawing Sheets

(58) Field of Classification Search
CPC .......... A63F 13/55; A63F 13/58; A63F 13/60; A63F 13/73
See application file for complete search history.

(56) References Cited

U.S. PATENT DOCUMENTS

2017/0340972 A1   11/2017  Seo
2018/0139507 A1*  5/2018  Toksoz .................. H04L 65/762
2019/0251603 A1*  8/2019  Jaatinen ................. G06N 3/006
2020/0391118 A1* 12/2020  Kerr ........................ A63F 13/67

OTHER PUBLICATIONS

Cheong, Yun-Gyung, et al., "Automatically Generating Summary Visualizations from Game Logs", Proceedings of the Fourth Artificial Intelligence and Interactive Digital Entertainment Conference, Oct. 2008, 6 pages.

Conati, Cristina, et al., "Modeling User Affect from Causes and Effects", Computer Science Department, University of British Columbia, Sep. 2009, 12 pages.

Sykownik, Philipp, et al., "Can You Hear the Player Experience? A Pipeline for Automated Sentiment Analysis of Player Speech", Conference on Games, Aug. 2019, 4 pages.

International Preliminary Report on Patentability mailed Sep. 29, 2022 for corresponding International Application No. PCT/US2020/033040, 9 pages.

European Office Action mailed Jan. 31, 2023 for EP Application No. 20730832.1, 5 pages.

* cited by examiner

FIG. 6

| LABELED ACTIONS/CONTEXTS 600 | |
|---|---|
| LABEL | ACTION/CONTEXT |
| OMINOUS | MUSIC LOOP 1 |
| ANXIOUS | MUSIC LOOP 2 |
| CALM | MUSIC LOOP 3 |
| JOY | MUSIC LOOP 4 |
| SHOCKING | SOUND EFFECT 1 |
| IRRITATING | SOUND EFFECT 2 |
| PLEASING | SOUND EFFECT 3 |
| ... | |

FIG. 5

| EVENT MAP 500 | |
|---|---|
| TEXT STRING | EVENT |
| FOREBODING | OMINOUS MUSIC |
| SHOCK SURPRISE | THUNDERCLAP |
| MILD FEAR | ZOMBIE SPAWN |
| FRUSTRATION | MISSED SHOT |
| SATISFACTION | MADE SHOT |
| PRIDE | HEAD SHOT |
| TERROR SURPRISE | ZOMBIE REVIVES |
| ... | |

USING SEMANTIC NATURAL LANGUAGE PROCESSING MACHINE LEARNING ALGORITHMS FOR A VIDEO GAME APPLICATION

CROSS-REFERENCE TO RELATED APPLICATIONS

The present application is a U.S. National Stage under 35 U.S.C. § 371 of International Patent Application Serial No. PCT/US2020/033040, entitled "USING SEMANTIC NATURAL LANGUAGE PROCESSING MACHINE LEARNING ALGORITHMS FOR A VIDEO GAME APPLICATION" and filed on May 15, 2020, which claims priority to U.S. Provisional Application No. 62/992,368, entitled "COORDINATING VIDEO GAME DECISIONS USING SEMANTIC NATURAL LANGUAGE PROCESSING MACHINE LEARNING ALGORITHMS" and filed on Mar. 20, 2020, the entireties of which are incorporated by reference herein.

BACKGROUND

Video game developers have numerous tools at their disposal for influencing the experiences of the people playing the game. Relatively positive experiences are generated by providing valuable or desirable objects such as loot, higher-quality weapons, more ammunition, complimentary feedback from non-player characters (NPCs), and the like. Relatively negative experiences are generated by providing less valuable or harmful objects such as empty treasure chests, booby-traps, derogatory feedback from NPCs, and the like. The intensity of the gaming experience can be varied by, for example, changing the number of enemies attacking the player's character, the strength of these enemies relative to the strength of the player's character, the predictability or randomness of the movement of the enemies, the complexity of the responses or actions required of the player, the volume or rhythm or degree of harmony/dissonance of the background music, a relatively static or chaotic visual field, and the like. Similar approaches are used to affect or modify other player experiences, e.g., to influence emotional states such as victorious feelings, feelings of accomplishment, feelings of interpersonal connection or affection, feelings of mastery, and the like.

SUMMARY

In some cases, video games are designed to evoke particular player experiences that reflect the current state of the game. For example, at least one widely-available video game uses a set of heuristics to modify the level of difficulty based on game state data such as the current player health, status, skill, location, ammo counts, and the like. However, the relationship between level difficulties and the game state data specified by the set of heuristics is only applicable to this video game and cannot be used by developers of other games. Furthermore, the set of heuristics is predefined and cannot be adapted or modified to change the content that is served to the players or the game state information that is used to select this content. This reduces the adaptability of the heuristics to a variety of game types. For example, the set of heuristics implemented in one type of video game (e.g., a chaotic multiplayer zombie shooter) would not likely be an appropriate choice of heuristics to influence the experience of a person playing a different type of video game (e.g., a serene single player reflection on life, love, and loss). And even if the set of heuristics established for one game was appropriate to another game, developers would not be able to use a bespoke system implemented in the game using game-specific code and would instead have to build their own system from the ground up, which would result in another system that is bespoke to the other game.

Against this background the proposed solution in particular relates to a (computer-implemented) method comprising executing a video game application at a video game processing system; in response to a game event during execution of the video game application, recording, by the video game processing system, a text string that represents the game event in a text log that comprises a sequence of text strings that represent game events that have been stored during execution of the video game application and thus while the video game has been played by a target player (i.e., game events that have transpired during a portion of the execution of the video game application and that, for example, have changed a state of the video game); generating, by the video game processing system using a semantic natural language processing (NLP) machine learning (ML) algorithm, scores for labeled actions or content based on the text log and a curve that is composed of data points representing values for a target user experience level at a point in time when playing the video game (the curve thus representing a target player experience as a function of progress through the game and, for example, being used to coordinate game decisions to influence player experience); and serving, by the video game processing system to a display associated with the video game processing system, at least one of the labeled actions or content that is selected based on the scores. For example, associating the events with text strings that are added or appended to a text log allows the text log to be used to determine a current player experience. The labels for the actions or context may be used by the semantic NLP ML algorithm to choose one or more of the actions or context to serve to the target player to influence the target player experience based on the curve and the scores.

The proposed solution generally relates to engine-agnostic and game-agnostic techniques (e.g., techniques that can be used in games regardless of the type of game or the game engine upon which the game is built) for influencing player experience based on game context using one or more machine learning (ML) algorithms for natural language processing (referred to herein as "an NLP ML algorithm") to select labeled actions or content based on a text-based log that represents previous game events and one or more curves representative of one or more target player experiences. Game events include, but are not limited to, player actions (e.g., pressing a button or combination of buttons on a game controller), choices made by the player at junctures in the game, measures of a player's skill or success rate in facing challenges presented by the game, events that are generated by the game (e.g., spawning a zombie or revealing loot), content or actions that are procedurally generated by the game, combinations of player and game actions (e.g., the player using the game controller to cause their character to enter a new room), and the like. Game developers map game events to corresponding text strings, e.g., using an application programming interface (API) to associate numbers, letters, words, or phrases with each event. In some embodiments, the mapping is stored in a table. A text log includes a sequence of text strings that represent game events that have transpired during a portion (or the entirety) of the game. The text strings are added to the text log in response to occurrences of the corresponding game event. One or more curves represent target player experiences as a function of progress through the game. Examples of player experiences that are represented by curves include, but are not limited to, calm/intensity, bad/good fortune, and semantic concepts such as "victorious." Game developers also define a set of actions or content that are labeled with text strings. For example, in a treasure chest system, different types of treasure or traps are associated with corresponding labels such as "silver," "gold," or "ticking time bomb." For another example, in a music system, different pieces of music are given labels such as "sad," "ominous," and "playful."

In operation, the semantic NLP ML algorithm uses the text log and the curves to score or rank labeled actions or content in the set (or a subset) of the labeled actions or content. In some embodiments, an API call is used to score or rank the labeled actions or content. The parameters of the API call include a context indicated by a text log, a curve representing the target player experience, an indicator of the type of curve, an indicator of a current place in the curve, and metadata indicating labels of the available actions or content. The API call returns a ranked list of the metadata, which is used to select the action or content that is served to the player. Some embodiments of the API call also return one or more of the scores for the content metadata generated by the NLP ML algorithm, an actual curve representing the actual player experience indicated by the text log, and the like. For example, if the API call includes a type that indicates that the curve is a calm/intensity curve, the semantic NLP ML algorithm uses the text log to rank the labeled actions/content based on how closely they match the target player experience indicated by the calm/intensity curve as a function of the player's progress through the game.

In some embodiments, one or more rules are used to modify the results provided by the semantic NLP ML algorithm based on alternate associations of terms or phrases used in the text log with the labels of actions or content. For example, in response to input indicating the action "killing," the semantic NLP ML algorithm will likely return a low score or ranking for a positive experience such as "feeling victorious." However, in a game world, killing many enemies could be a signal that the player is victorious. A rule can therefore be applied to modify the scores returned by the semantic NLP ML algorithm so that "killing" has a strong association with "feeling victorious." When this rule is applied, the ranking produced by the semantic NLP ML algorithm is modified to increase the ranking of the experience of "feeling victorious" in response to the text log including the string "killing' or strings associated with "killing." Thus, a game that implements this rule can generate actions or serve content associated with the player "feeling victorious" in response to the player killing many enemies, even though the semantic NLP ML algorithm would not necessarily give this association a high score or ranking.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

FIG. 5 is a block diagram of an event map that maps or associates text strings to events or context that occur within a game according to some embodiments.

FIG. 6 is a block diagram of a table of labeled actions or context for a game according to some embodiments.

DETAILED DESCRIPTION

FIGS. 1-8 disclose engine-agnostic and game-agnostic techniques for influencing player experience based on game context using one or more machine learning (ML) algorithms for natural language processing (referred to herein as "an NLP ML algorithm") to select labeled actions or content based on a text-based log that represents previous game events and one or more curves representative of one or more target player experiences.

Figure 1:
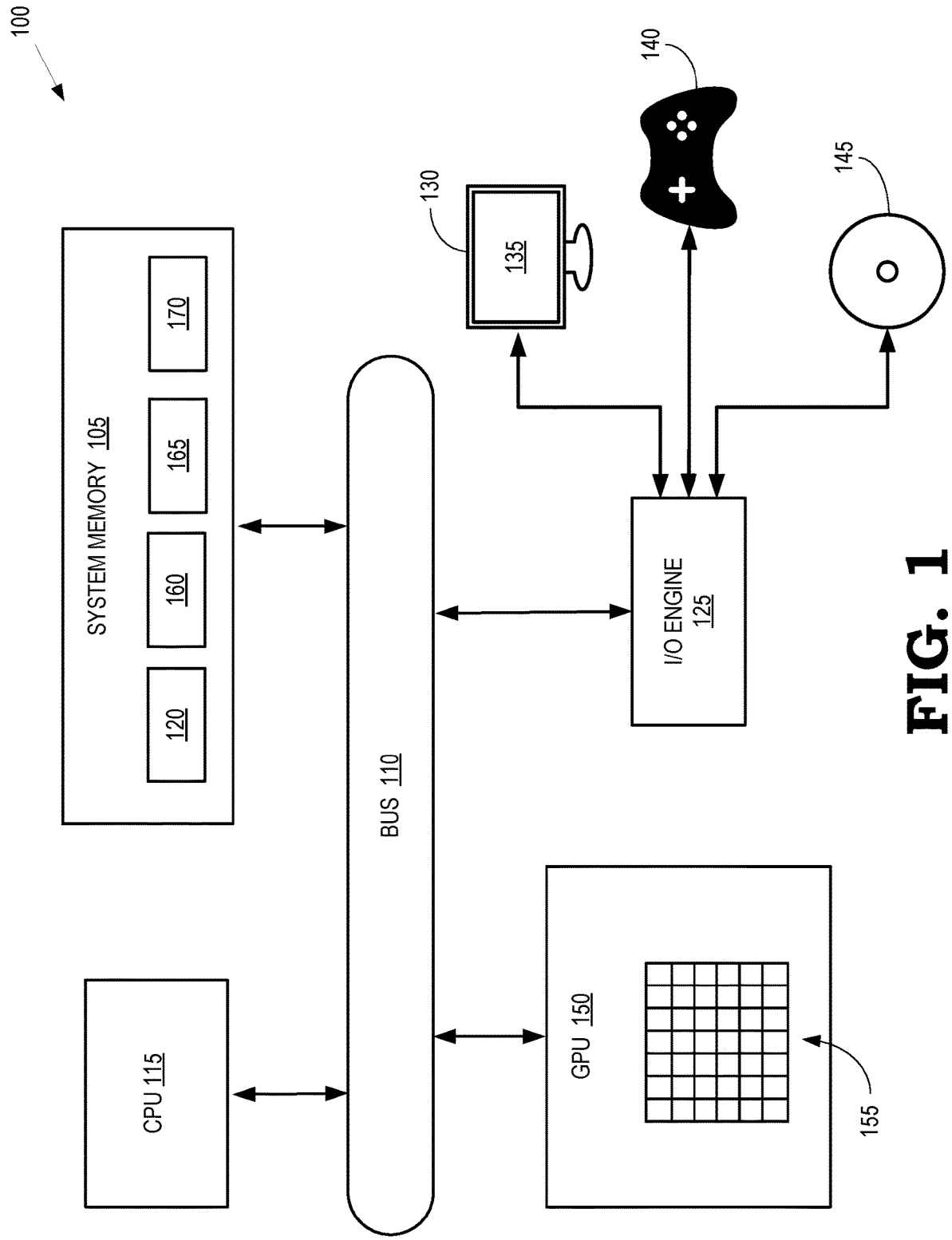
FIG. 1 is a block diagram of a video game processing system that supports coordinating game decisions using a semantic natural language processing (NLP) machine learning (ML) algorithm according to some embodiments.

FIG. 1 is a block diagram of a video game processing system 100 that supports coordinating game decisions using a semantic natural language processing (NLP) machine learning (ML) algorithm according to some embodiments. The processing system 100 includes or has access to a system memory 105 or other storage element that is implemented using a non-transitory computer readable medium such as a dynamic random-access memory (DRAM). However, some embodiments of the memory 105 are implemented using other types of memory including static RAM (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a central processing unit (CPU) 115. Some embodiments of the CPU 115 include multiple processing elements (not shown in FIG. 1 in the interest of clarity) that execute instructions concurrently or in parallel. The processing elements are referred to as processor cores, compute units, or using other terms. The CPU 115 is connected to the bus 110 and the CPU 115 communicates with the memory 105 via the bus 110. The CPU 115 executes instructions such as program code 120 stored in the memory 105 and the CPU 115 stores information in the memory 105 such as the results of the executed instructions. The CPU 115 is also able to initiate graphics processing by issuing draw calls.

An input/output (I/O) engine 125 handles input or output operations associated with a display 130 that presents images or video on a screen 135. In the illustrated embodiment, the I/O engine 125 is connected to a game controller 140 which provides control signals to the I/O engine 125 in response to a user pressing one or more buttons on the game controller 140 or interacting with the game controller 140 in other ways, e.g., using motions that are detected by an accelerometer. The I/O engine 125 also provides signals to the game controller 140 to trigger responses in the game controller 140 such as vibrations, illuminating lights, and the like. In the illustrated embodiment, the I/O engine 125 reads information stored on an external storage element 145, which is implemented using a non-transitory computer readable medium such as a compact disk (CD), a digital video disc (DVD), and the like. The I/O engine 125 also writes information to the external storage element 145, such as the results of processing by the CPU 115. Some embodiments of the I/O engine 125 are coupled to other elements of the processing system 100 such as keyboards, mice, printers, external disks, and the like. The I/O engine 125 is coupled to the bus 110 so that the I/O engine 125 communicates with the memory 105, the CPU 115, or other entities that are connected to the bus 110.

The processing system 100 includes a graphics processing unit (GPU) 150 that renders images for presentation on the screen 135 of the display 130, e.g., by controlling pixels that make up the screen 135. For example, the GPU 150 renders objects to produce values of pixels that are provided to the display 130, which uses the pixel values to display an image that represents the rendered objects. The GPU 150 includes one or more processing elements such as an array 155 of compute units that execute instructions concurrently or in parallel. Some embodiments of the GPU 150 are used for general purpose computing. In the illustrated embodiment, the GPU 150 communicates with the memory 105 (and other entities that are connected to the bus 110) over the bus 110. However, some embodiments of the GPU 150 communicate with the memory 105 over a direct connection or via other buses, bridges, switches, routers, and the like. The GPU 150 executes instructions stored in the memory 105 and the GPU 150 stores information in the memory 105 such as the results of the executed instructions. For example, the memory 105 stores instructions that represent a program code 160 that is to be executed by the GPU 150.

The CPU 115, the GPU 150, or a combination thereof execute machine learning algorithms such as a semantic NLP ML algorithm. In the illustrated embodiment, the system memory 105 stores program code 165 that represents a semantic NLP ML algorithm that has been trained using a corpus of natural language data. Many text corpuses are available for training machine learning algorithms including corpuses related to media/product reviews, news articles, email/spam/newsgroup messages, tweets, dialogues, and the like. The CPU 115, the GPU 150, or one or more of the compute units in the array 155 execute the program code 165 that represents the trained semantic NLP ML algorithm in either input/response modality or a semantic similarity modality.

In the illustrated embodiment, the CPU 115 and the GPU 150 execute corresponding program code 120, 160 to implement a video game application. For example, user input received via the game controller 140 is processed by the CPU 115 to modify a state of the video game application. The CPU 115 then transmits draw calls to instruct the GPU 150 to render images representative of a state of the video game application for display on the screen 135 of the display 130. As discussed herein, the GPU 150 can also perform general-purpose computing related to the video game application such as executing the program code 165 that represents a semantic NLP ML algorithm implemented in the game. In the illustrated embodiment, the system memory 105 includes a portion 170 that is reserved for storing game-related information, although this information can be stored in other locations in some embodiments.

The CPU 115 and the GPU 150 use instances of the semantic NLP ML algorithm to coordinate game decisions to influence the player experience by selecting actions or content to be served to the player based on a current state of the game and a target player experience. The state of the game changes substantially continuously as game events transpire and the GPU 150 keeps track of the events using a text log that is stored in the portion 170 of the memory 105. One or more text strings that represent the game event are recorded in the text log in response to each event that occurs in the game. The text log therefore includes a sequence of text strings that represent game events that have transpired during a portion (or the entirety) of the game. A set of actions or events that are potentially served to the player of the game are labeled with text phrases and stored in the portion 170 of the system memory 105. Some embodiments of the semantic NLP ML algorithm generate scores for the labeled actions or content based on the text log and a curve that represents a target player experience as a function of progress through the game. One or more of the labeled actions or content is then selected based on their scores and the selected actions or content are served to the player.

Figure 2:
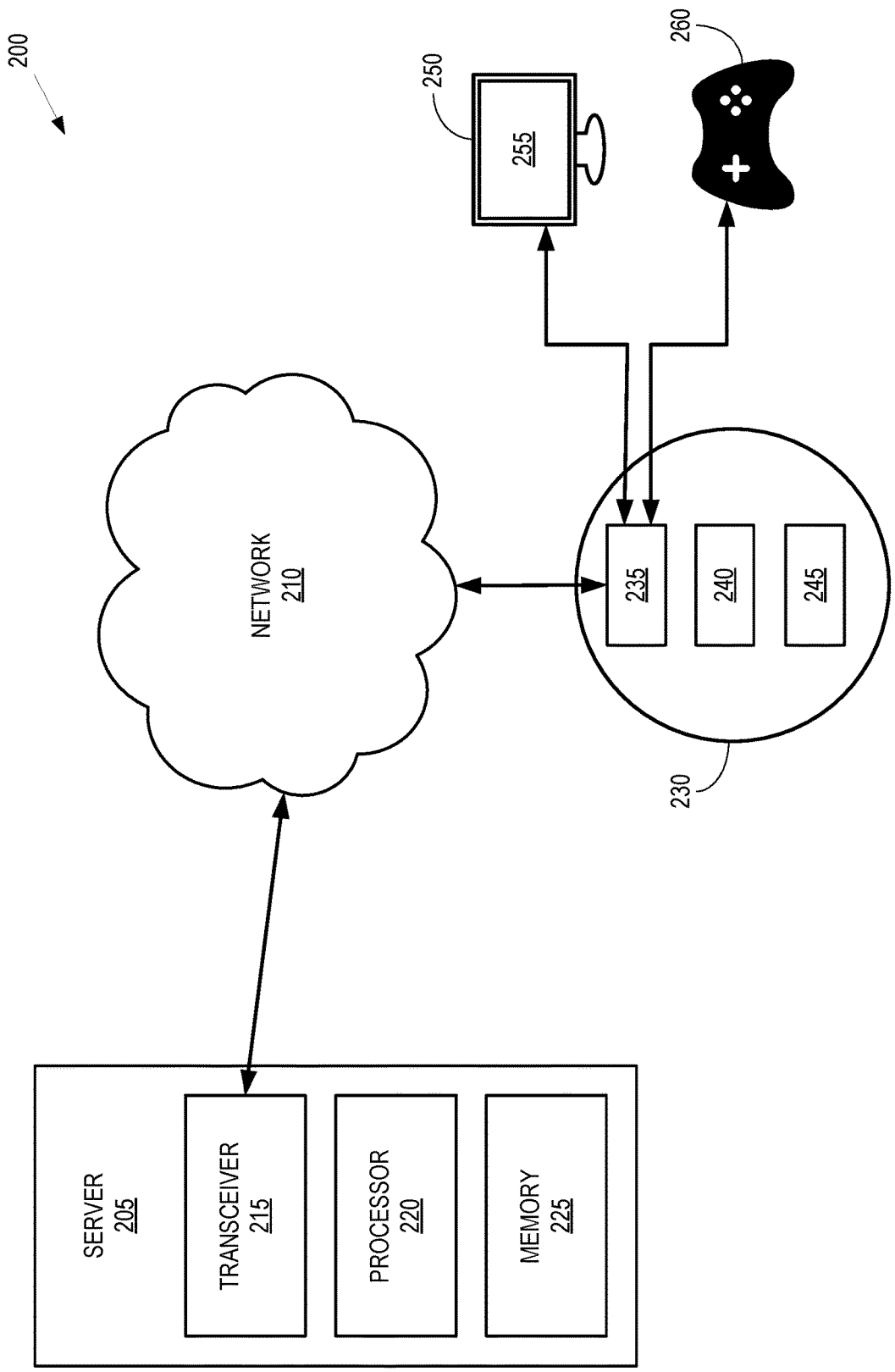
FIG. 2 is a block diagram of a cloud-based system that supports coordinating game decisions using a semantic NLP ML algorithm according to some embodiments.

FIG. 2 is a block diagram of a cloud-based system 200 that supports coordinating game decisions using a semantic NLP ML algorithm according to some embodiments. The cloud-based system 200 includes a server 205 that is interconnected with a network 210. Although a single server 205 shown in FIG. 2, some embodiments of the cloud-based system 200 include more than one server connected to the network 210. In the illustrated embodiment, the server 205 includes a transceiver 215 that transmits signals towards the network 210 and receives signals from the network 210. The transceiver 215 can be implemented using one or more separate transmitters and receivers. The server 205 also includes one or more processors 220 and one or more memories 225. The processor 220 executes instructions such as program code stored in the memory 225 and the processor 220 stores information in the memory 225 such as the results of the executed instructions.

The cloud-based system 200 includes one or more processing devices 230 such as a computer, set-top box, gaming console, and the like that are connected to the server 205 via the network 210. In the illustrated embodiment, the processing device 230 includes a transceiver 235 that transmits signals towards the network 210 and receives signals from the network 210. The transceiver 235 can be implemented using one or more separate transmitters and receivers. The processing device 230 also includes one or more processors 240 and one or more memories 245. The processor 240 executes instructions such as program code stored in the memory 245 and the processor 240 stores information in the memory 245 such as the results of the executed instructions. The transceiver 235 is connected to a display 250 that displays images or video on a screen 255 and a game controller 260. Some embodiments of the cloud-based system 200 are therefore used by cloud-based game streaming applications.

The processor 220, the processor 240, or a combination thereof execute program code representative of game that implements a semantic NLP ML algorithm in either input/response modality or a semantic similarity modality. As discussed herein, the semantic NLP ML algorithm is pretrained using one or more text corpuses. The game time decisions that affect the player experience are coordinated using the semantic NLP ML algorithm, as discussed herein.

Figure 3:
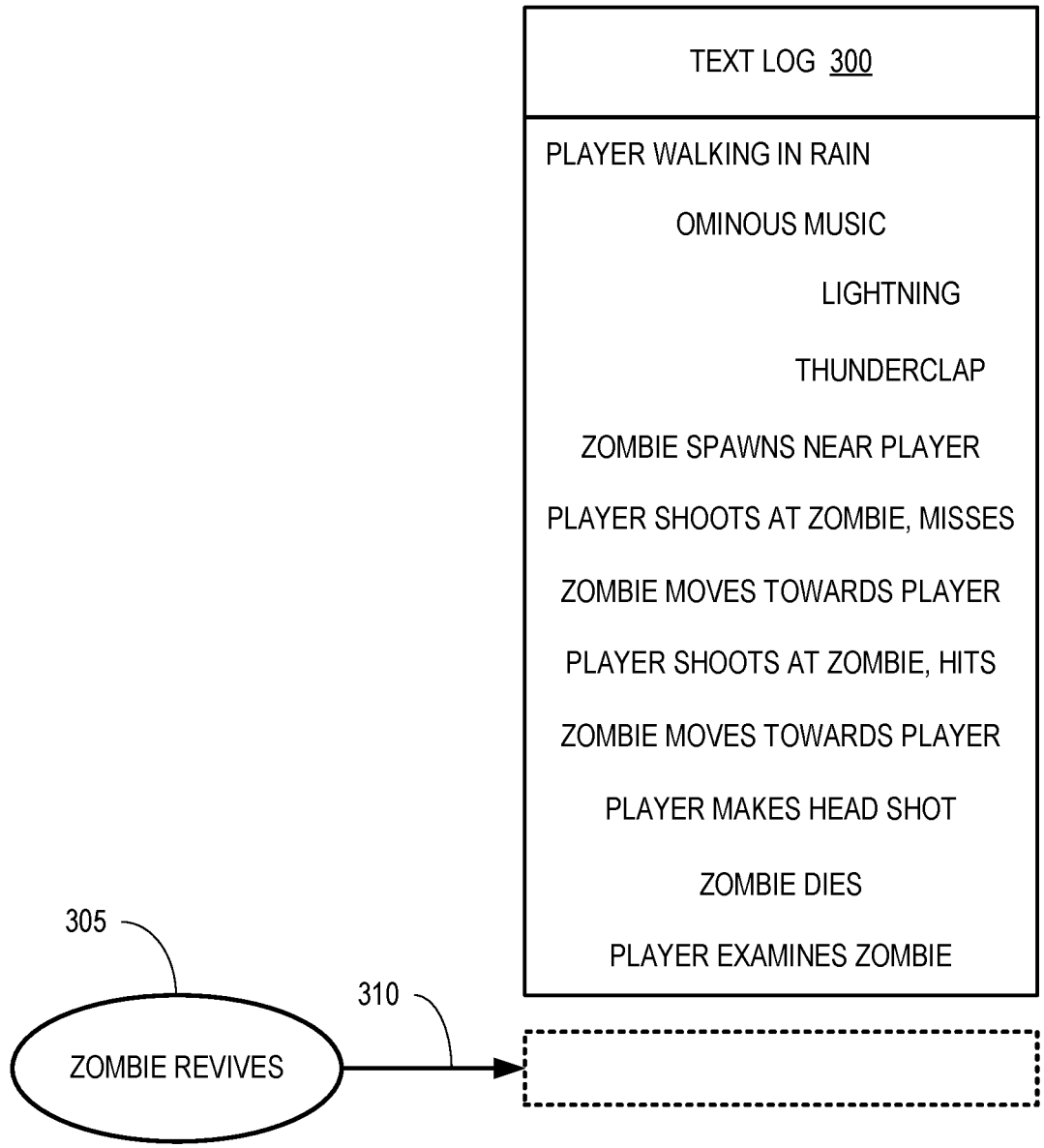
FIG. 3 is a block diagram that illustrates a text log made up of a sequence of text strings that represent events in the game according to some embodiments.

FIG. 3 is a block diagram that illustrates a text log 300 made up of a sequence of text strings that represent events in the game according to some embodiments. The text log 300 is generated by some embodiments of the GPU 150 shown in FIG. 1 and the processors 220, 240 shown in FIG. 2. Some embodiments of the text log are stored in a memory such as the system memory 105 shown in FIG. 1 and the memories 225, 245 shown in FIG. 2.

The text strings in the text log 300 represent a portion (or the entirety) of the game and indicate the player experience up to the current point in the game. As illustrated in FIG. 3, the events recorded in the text log 300 include information such as the information in Table 1, which includes a identifying a text string associated with an event, a time at which the event occurs, and the text string representing the event.

TABLE 1

| Number | Time | Text String |
| --- | --- | --- |
| 1 | 0:00.00 | Player walking in rain |
| 2 | 0:00.00 | Ominous music |
| 3 | 0:30.00 | Lightning |
| 4 | 0:30.50 | Thunderclap |
| 5 | 0:32.00 | Zombie Spawns Near Player |
| 6 | 0:33.00 | Player Shoots Zombie, Misses |
| 7 | 0:33.10 | Zombie Moves Towards Player |
| 8 | 0:35:00 | Player Shoots Zombie, Hits |
| 9 | 0:35.10 | Zombie Moves Towards Player |
| 10 | 0:36.00 | Player Makes Headshot |
| 11 | 0:36.10 | Zombie Dies |
| 12 | 0:40.00 | Player Examines Zombie |

Additional text strings are added to the text log 300 in response to events occurring in the game. In the illustrated embodiment, an action 305 occurs that is represented by the text string "Zombie revives," which indicates that the zombie that appeared to be dead has returned from the grave (again). The text string representative of the action 305 is then added to the text log 300, as indicated by the arrow 310.

Figure 4:
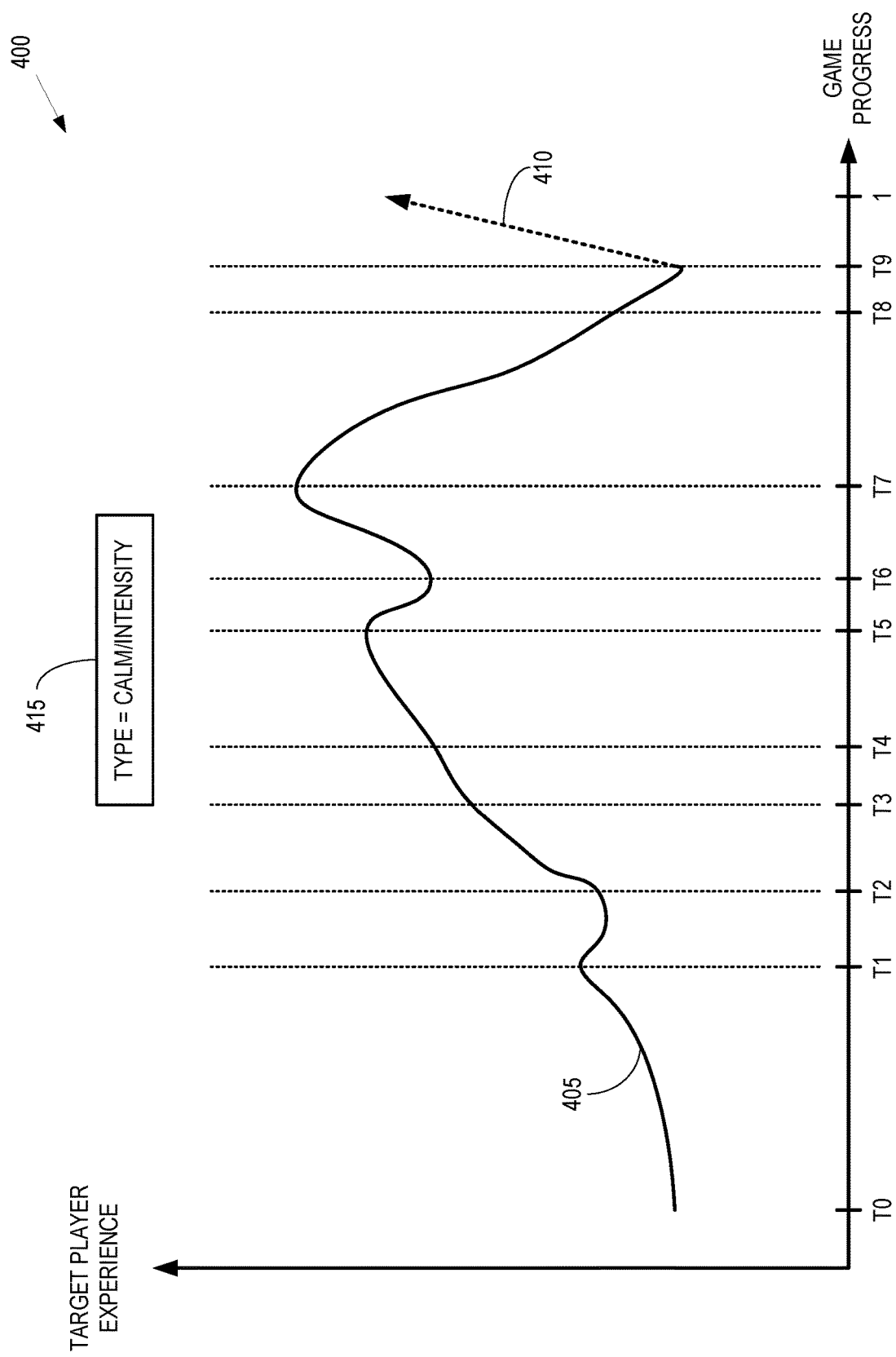
FIG. 4 is a plot of a curve that represents a target player experience as a function of game progress according to some embodiments.

FIG. 4 is a plot 400 of a curve 405 that represents a target player experience as a function of game progress according to some embodiments. The vertical axis of the plot 400 indicates a target player experience (in arbitrary units) and the horizontal axis of the plot 400 indicates game progress from the beginning of the game (zero) to the end of the game (one). In the illustrated embodiment, the curve 405 represents a target level of calm/intensity and points on the curve 405 correspond to the events represented by the text strings in the text log 300 shown in FIG. 3. However, in other embodiments, the curve 405 represents different target player experiences such as positive/negative sentiments, tracking of a semantic concept such as "victorious" or "sense of belonging," and the like. The curve 405 can be bespoke, provided by a game developer, provided by a player, or created at runtime.

Initially, at time T0, the target player experience is relatively calm as indicated by the relatively low value of the curve 405. The player begins to progress through the game and the environment experienced by the player is reflected in the text strings in the text log. For example, the text log indicates that the player is walking in the rain and ominous music is playing, which is intended to gradually raise the sense of intensity, as indicated by the increasing value of the curve 405 from T0 to T1.

At the time T1, the text log includes a text string indicating that lightning struck and there was a thunderclap. A small spike in the curve 405 around the time T1 indicates an increase in the intensity of the player experience corresponding to the lightning and thunder.

At the time T2, the text log includes a text string indicating that a zombie has spawned nearly player. Adding a threatening character near the player is intended to increase the intensity of the player experience, as indicated by the curve 405 rising from time T2 to time T3.

At the time T3, the text log includes a text string indicating that the player attempted a shot at the zombie. However, the text string also indicates that the player missed the shot and so the intensity of the player experience continues to increase, as indicated by the curve 405 rising from time T3 to time T4.

At the time T4, the text log includes a text string indicating that the zombie continued to move towards the player. Reducing the distance between the zombie and the player increases the intensity of the player experience, as indicated by the curve rising from time T4 to time T5.

At the time T5, the text log includes a text string indicating that the player attempted a shot at the zombie. The text string also indicates that the player's shot hit the zombie. Successfully shooting the zombie reduces the intensity of the player experience, as indicated by the curve 405 falling from time T4 to time T5.

At the time T6, the text log includes a text string indicating that the zombie is not dead and continued to move towards the player. Reducing the distance between the zombie and the player increases the intensity of the player experience, as indicated by the curve rising from time T6 to time T7.

At the time T7, the text log includes a text string indicating that the player attempted a shot at the zombie. The text string also indicates that the player's shot hit the zombie in the head and the zombie died. The successful headshot and death of the zombie reduce the intensity of the player experience, as indicated by the curve 405 falling from time T7 to time T8.

At the time T8, the text log includes a text string indicating that the player examined the dead zombie. The zombie appeared to be dead and the intensity of the player experience continued to decrease, as indicated by the curve falling from time T8 to time T9.

At the time T9, the player is examining the "dead" zombie and the zombie revives, as shown in the action 305 in FIG. 3. The unexpected revival of the zombie will cause the intensity of the player experience to spike, as indicated by the rising dashed arrow 410 after the time T9.

Some embodiments of the curve 405 are used to coordinate game decisions to influence player experience. For example, a semantic NLP ML algorithm uses the text log 300 shown in FIG. 3 and the curve 405 to score or rank labeled actions or content in a set (or a subset) of labeled actions or content. The semantic NLP ML algorithm returns a ranked list of the labeled actions or content, which is then used to select the action or content that is served to the player. Although a single curve 405 is shown in FIG. 4, multiple curves are used in some embodiments to coordinate game decisions. The aspects of the player experience represented by the different curves are indicated by a curve type 415. For example, a first curve type indicates that the corresponding curve represents calm/intensity, a second curve type indicates that the corresponding curve indicates positive/negative experiences, and a third curve type indicates a semantic type such as "victorious" or "sense of belonging."

FIG. 5 is a block diagram of an event map 500 that maps or associates text strings to events or context that occur within a game according to some embodiments. The text strings are written or appended to a text log (such as the text log 300 shown in FIG. 3) in response to the corresponding event occurring in the game. The event map 500 is created by game developers based on the events or context that are used to influence player experience within the game. For example, as indicated in the event map 500, a sense of "foreboding" is associated with playing "ominous music" and a sense of "shock, surprise" is associated with a "thunderclap." Associating the events with text strings that are added or appended to a text log allows the text log to be used to determine a current player experience, as discussed herein.

FIG. 6 is a block diagram of a table 600 of labeled actions or context for a game according to some embodiments. The labels for the actions or context are used by a semantic NLP ML algorithm to choose one or more of the actions or context to serve to a player to influence player experience based on a curve (such as the curve 405 shown in FIG. 4) that represents a target player experience as a function of progress through the game. Some embodiments of the table 600 are created by a game developer prior to runtime to associate text labels with actions or context that are available for presentation to the player during the game. For example, a "music loop 1" is labeled with the text string "ominous" to indicate that "music loop 1" influences player experience by increasing a sense of worry or foreboding. For another example, the "sound effect 1" is labeled with the texturing "shocking" to indicate that playing "sound effect 1" influences player experience by surprising or shocking the player.

The example shown in table 600 is not meant to be exhaustive. To the contrary, the actions or context that are labeled with text strings and available for provision to the player during progress of the game can include anything developed for the game. The actions or contexts can include assets or data describing how new assets could be generated. For example, the labeled content can include all the characters created for the game or set up to be generated by the game, modular world tiles associated with features and rules that govern how they connect to other tiles, data tables describing enemy's spawns (e.g., how many enemies, level of challenge, spawn location), data tables describing loot (e.g., range of items, value of items, each of which can be tagged with a text string), weather system settings, animation sets for characters, world status settings, music, and the like. In some embodiments, game developers create multiple tables and associate different tables with different curves indicating different aspects of the player experience.

Figure 7:
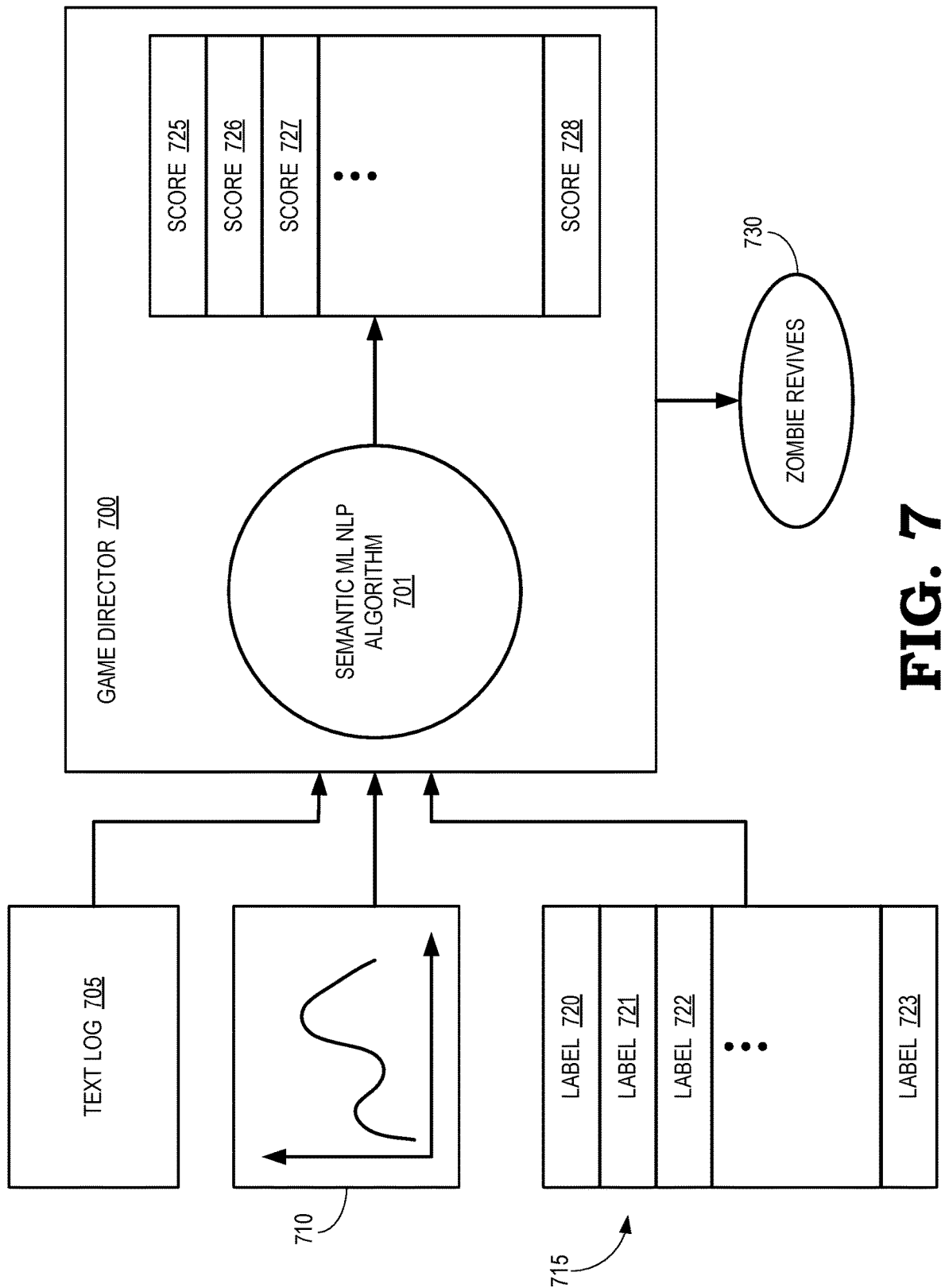
FIG. 7 is a block diagram of a game director to make coordinated game decisions using one or more instances of a semantic NLP ML algorithm according to some embodiments.

FIG. 7 is a block diagram including a game director 700 that makes coordinated game decisions using one or more instances of a semantic NLP ML algorithm 701 according to some embodiments. The game director 700 is implemented in some embodiments of the GPU 150 shown in FIG. 1 and the processors 220, 240 shown in FIG. 2. In the illustrated embodiment, a text log 705 such as the text log 300 shown in FIG. 3, a curve 710 such as the curve 405 shown in FIG. 4, and a set 715 of labels actions/contexts such as the set of labeled actions/context listed in table 600 in FIG. 6 are provided to the semantic NLP ML algorithm 701. The set 715 includes labels 720, 721, 722, 723, which are collectively referred to herein as "the labels 720-723."

The game director 700 uses the instances of the semantic NLP ML algorithm 701 to generate scores for labeled actions/contexts based on a text log and a curve of target player experience. Generating the scores includes: (1) assessing the current player experience based on the text log and (2) generating the scores for the labeled actions/contexts based on the current player experience, the target player experience indicated by the curve, and the labeled actions/contexts. In the illustrated embodiment, the game director 700 assesses the current player experience using the semantic NLP ML algorithm 701 and sentiment analysis. For example, the game director 700 determines whether there is a calming ambient audio of wind or ominous music creating tension, are there enemies spawning all around the player or is the player in a serene, cozy space? The sentiment that is evaluated based on the curve corresponds to the type of the curve. For example, the relative calm or intensity of the situation is evaluated if the curve indicates calm/intensity, the fortune of the player experience is evaluated if the curve indicates good/bad fortune, and other semantic concepts such as "victorious" or "sense of belonging" are evaluated for corresponding types of curves.

The game director 700 then uses the semantic NLP ML algorithm 701 to generate scores 725, 726, 727, 728 (collectively referred to herein as "the scores 725-728") that rank the labels 720-723 based on the current player experience and the target player experience indicated by the curve. For example, if the curve is used to track good/bad fortune for the player and if the text log indicates that the current player experience has been an unending stream of bad fortune, the semantic NLP ML algorithm 701 can return a score for opening a treasure chest to find a rare, valuable item that is higher than the score for opening the treasure chest to reveal a devastating trap. Conversely, the semantic NLP ML algorithm 701 can return a lower score for the rare, valuable item and a higher score for the devastating trap if the current player experience has been exceptionally good. For another example, if the curve tracks a semantic concept such as "victorious" or "sense of belonging," the semantic NLP ML algorithm 701 ranks the labels 720-723 based on the current player experience such as whether the player quests dealt with themes regarding "belonging to a tribe" or how "victorious" the player has been in previous encounters with enemies.

As discussed herein, the semantic NLP ML algorithm 701 is pre-trained using one or more text corpuses. Pre-training the semantic NLP ML algorithm 701 on conventional text corpuses causes the semantic NLP ML algorithm 701 to generate higher scores 725-728 for responses that are consistent with conventional usage or interpretation of the terms in the text log 705 and the labels 720-723. However, some embodiments of the semantic NLP ML algorithm 701 are implemented in game worlds that purposely redefine concepts to contrast with their real-world interpretations. Post-processing of the results provided by the semantic NLP ML algorithm 701 is therefore used to modify the scores of 725-728 based on one or more rules that redefine the associations between the terms or phrases in the text log 705 and the labels 720-723.

In response to a request to serve dynamic content, the game director 700 uses the text log 705, the curve 710, and the set 715 of labeled actions/contexts to choose one or more actions or context to serve to the player. The game director 700 chooses the actions or context based on the scores 725-728. In some embodiments, the actions or context that are served by the game director 700 are expressed in natural language to enable subsequent NLP-based analysis. For example, the game director 700 can choose an action 730 that results in an apparently dead zombie being revived, which is represented by the text string "Zombie revives." Information that is used to select the action includes, but is not limited to:

- The player choice expressed in the game, e.g., where did the player choose to go, are they role-playing as a paragon or an immoral character, etc.
- The (possibly emergent) events that have transpired in the game so far, e.g., if there was procedurally generated content, what is it, what form to take, and how has it affected the game world and state.
- The analysis of the player's experience so far, e.g., have they struggled or are they having too easy a time, is there enough variety to their experience?
- The decisions made by other players that have affected the game world.

Figure 8:
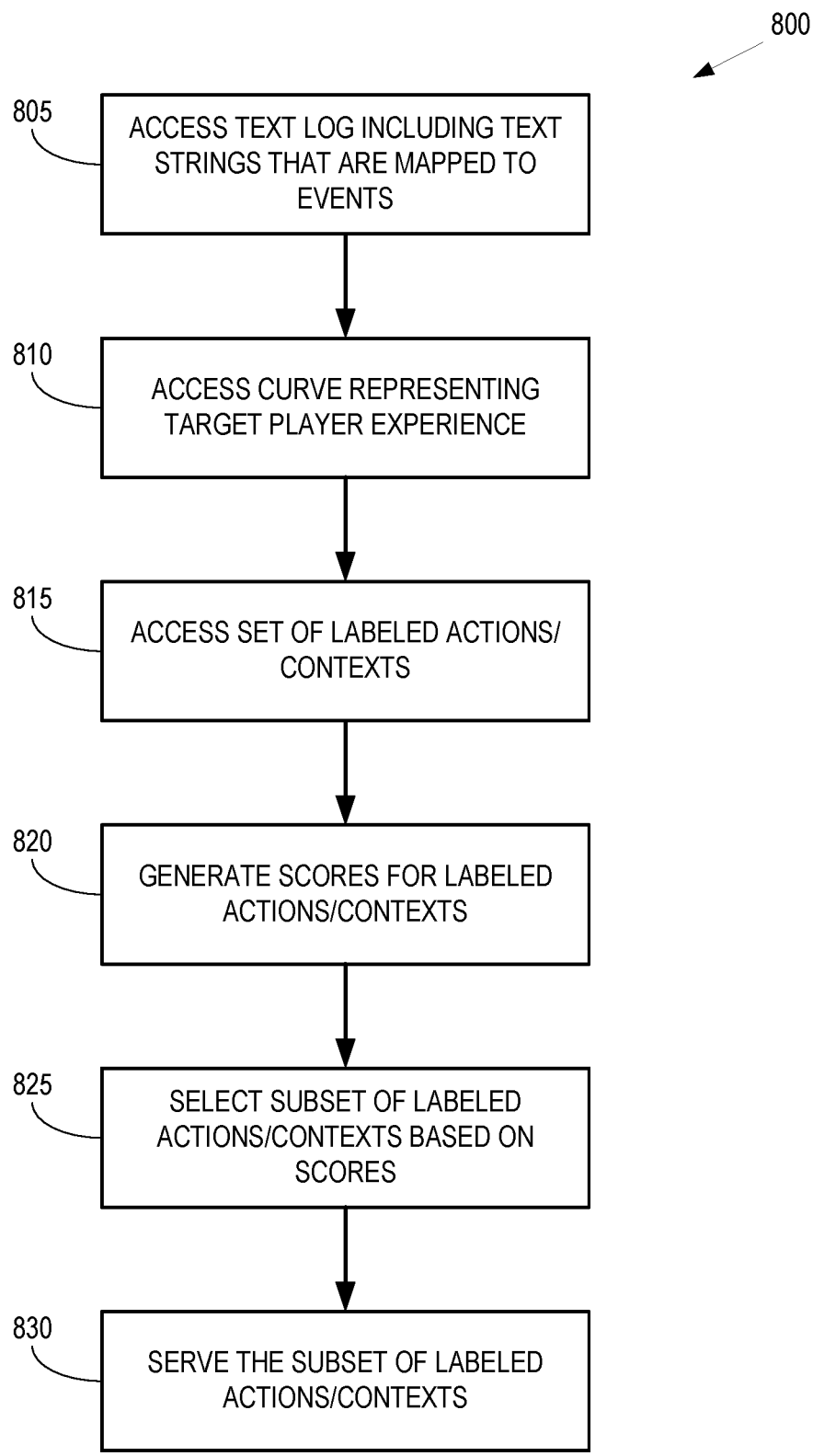
FIG. 8 is a flow diagram of a method of coordinating game decisions using semantic NLP ML algorithms according to some embodiments.

FIG. 8 is a flow diagram of a method 800 of coordinating game decisions using semantic NLP ML algorithms according to some embodiments. The game director 700 is implemented in some embodiments of the GPU 150 shown in FIG. 1, the processors 220, 240 shown in FIG. 2, and the game director 700 shown in FIG. 7.

At block 805, the game director accesses a text log including text strings that are mapped to events that have occurred in the game or a portion of the game. At block 810, the game director accesses the curve representing a target player experience as a function of progress through the game. At block 815, the game director accesses a set of labeled actions/contexts that are available for providing to the player. Although the blocks 805, 810, 815 are presented sequentially in FIG. 8, some embodiments of the method 800 perform the blocks 805, 810, 815 in a different order or concurrently. In some embodiments, an API call is used to perform the actions in blocks 805, 810, 815. The parameters of the API call include a context indicated by a text log, a curve representing the target player experience, an indicator of the type of curve, an indicator of a current place in the curve, and metadata indicating labels of the available actions or content.

At block 820, an instance of the semantic NLP ML algorithm generates scores for the labeled actions/contexts, as discussed herein. In some embodiments, the API call returns a ranked list of the metadata, which is used to select the action or content that is served to the player. Some embodiments of the API call also return one or more of the scores for the content metadata generated by the NLP ML algorithm, an actual curve representing the actual player experience indicated by the text log, and the like. For example, if the API call includes a type that indicates that the curve is a calm/intensity curve, the semantic NLP ML algorithm uses the text log to rank the labeled actions/content based on how closely they match the target player experience indicated by the calm/intensity curve as a function of the player's progress through the game.

At block 825, the game director selects a subset of the labeled actions/contexts based on the scores. In some embodiments, the game director selects labeled action/contexts to be in the subset in response to the corresponding scores being above a threshold. At block 830, the game director (or other processor) serves the subset of labeled actions/contexts to the player.

In some embodiments, certain aspects of the techniques described above may be implemented by one or more processors of a processing system executing software. The software comprises one or more sets of executable instructions stored or otherwise tangibly embodied on a storage element implemented using a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
  executing a video game application at a video game processing system;

in response to a game event during execution of the video game application, recording, by the video game processing system, a text string that represents the game event in a text log that comprises a sequence of text strings that represent game events that have transpired during a portion of the execution of the video game application;

generating, by the video game processing system using a semantic natural language processing (NLP) machine learning (ML) algorithm, scores for labeled actions or content based on information provided via an application programming interface (API) call, the provided information indicating a context indicated by the text log, a curve that represents a target player experience as a function of progress through the game, an indication of a type of the curve, and metadata indicating labels for the labeled actions or content;

returning, via the API call, a ranked list of the metadata; and selecting, by the video game processing system, the at least one of the labeled actions or content to be served based on the ranked list.

2. The method of claim 1, further comprising:
mapping, by the video game processing system, a set of game events to a corresponding set of text strings.

3. The method of claim 2, further comprising:
adding, by the video game processing system, a text string of the set of text strings to the text log in response to occurrence of a corresponding one of the set of game events.

4. The method of claim 1, further comprising:
labeling, by the video game processing system, a set of actions or content with a corresponding set of text strings to generate the labeled actions or content.

5. The method of claim 1, further comprising:
serving, by the video game processing system to a display associated with the video game processing system, at least one of the labeled actions or content that is selected based on the scores.

6. The method of claim 1, wherein the semantic NLP ML algorithm uses the text log to rank the labeled actions or content based on how closely they match the target player experience indicated by the curve of the type indicated by the indicator of the type of the curve.

7. The method of claim 1, further comprising:
returning, via the API call, at least one of the scores generated by the semantic NLP ML algorithm for the metadata or an actual curve representing an actual player experience indicated by the text log.

8. The method of claim 1, further comprising:
modifying the scores generated by the semantic NLP ML algorithm based on alternate associations of the text strings in the text log with labels of the labeled actions or content, wherein the alternate associations are indicated by at least one rule.

9. The method of claim 8, wherein the at least one rule indicates at least one association between a text string and a label that is different than, or contrary to, at least one conventional association indicated by a corpus that is used to train the semantic NLP ML algorithm.

10. An apparatus, comprising:
a storage element configured to store executable a semantic natural language processing (NLP) machine learning (ML) algorithm; and
at least one processor configured to, in response to a game event during execution of a video game application:

record a text string that represents the game event in a text log that comprises a sequence of text strings that represent game events that have transpired during a portion of the execution of the video game application;

generate, using the semantic NLP ML algorithm, scores for labeled actions or content based on information provided via an application programming interface (API) call, the provided information indicating a context indicated by the text log, a curve that represents a target player experience as a function of progress through the game, an indication of a type of the curve, and metadata indicating labels for the labeled actions or content;

returning, via the API call, a ranked list of the metadata; and selecting, by the video game processing system, the at least one of the labeled actions or content to be served based on the ranked list.

11. The apparatus of claim 10, wherein the processor is configured to map a set of game events to a corresponding set of text strings, and wherein the mapping is stored in the storage element.

12. The apparatus of claim 11, wherein the processor is configured to add one of the set of text strings to the text log in response to occurrence of a corresponding one of the set of game events.

13. The apparatus of claim 10, wherein the processor is configured to serve, to a display associated with the video game application, at least one of the labeled actions or content that is selected based on the scores.

14. The apparatus of claim 10, wherein the processor is configured to:
return, via the API call, a ranked list of the metadata; and
select the at least one of the labeled actions or content to be served based on the ranked list.

15. The apparatus of claim 14, wherein the semantic NLP ML algorithm uses the text log to rank the labeled actions or content based on how closely they match the target player experience indicated by the curve of the type indicated by the indicator of the type of the curve.

16. The apparatus of claim 14, wherein the processor is configured to return, via the API call, at least one of the scores generated by the semantic NLP ML algorithm for the metadata or an actual curve representing an actual player experience indicated by the text log.

17. The apparatus of claim 10, wherein the processor is configured to modify the scores generated by the semantic NLP ML algorithm based on alternate associations of the text strings in the text log with labels of the labeled actions or content, wherein the alternate associations are indicated by at least one rule.

18. The apparatus of claim 17, wherein the at least one rule indicates at least one association between a text string and a label that is different than, or contrary to, at least one conventional association indicated by a corpus that is used to train the semantic NLP ML algorithm.

19. A non-transitory computer readable medium embodying a set of executable instructions, the set of executable instructions to manipulate at least one processor to:
in response to a game event during execution of a video game application, record a text string that represents the game event in a text log that comprises a sequence of text strings that represent game events that have transpired during a portion of the execution of the video game application;

generate, using a semantic natural language processing (NLP) machine learning (ML) algorithm, scores for labeled actions or content based on information provided via an application programming interface (API) call, the provided information indicating a context indicated by the text log, a curve that represents a target player experience as a function of progress through the game, an indication of a type of the curve, and metadata indicating labels for the labeled actions or content;

returning, via the API call, a ranked list of the metadata; and selecting, by the video game processing system, the at least one of the labeled actions or content to be served based on the ranked list.

* * * * *